United States Patent
Cordts et al.

(10) Patent No.: US 7,104,892 B2
(45) Date of Patent: Sep. 12, 2006

(54) COUPLING

(75) Inventors: Detlef Cordts, Schoenwalde (DE);
Robert Peters, Bocholt (DE);
Christian Meyer, Henningsdorf (DE)

(73) Assignees: Carl Freudenberg KG, Weinheim (DE); A. Friedrich Flender AG, Bocholt (DE)

( * ) Notice: Subject to any disclaimer, the term of this patent is extended or adjusted under 35 U.S.C. 154(b) by 0 days.

(21) Appl. No.: 10/620,482

(22) Filed: Jul. 16, 2003

(65) Prior Publication Data

US 2004/0035664 A1      Feb. 26, 2004

(30) Foreign Application Priority Data

Jul. 16, 2002     (DE) ................ 102 32 286

(51) Int. Cl.
*F16D 3/70*      (2006.01)

(52) U.S. Cl. ........................... 464/70; 464/85

(58) Field of Classification Search ............ 464/70–72, 464/81, 85

See application file for complete search history.

(56) References Cited

U.S. PATENT DOCUMENTS

| | | | | |
|---|---|---|---|---|
| RE30,381 E | * | 8/1980 | Ries | ............ 464/72 X |
| 5,186,686 A | * | 2/1993 | Staples et al. | ............ 464/70 X |
| 5,507,692 A | * | 4/1996 | Chivari | ............ 464/81 X |

FOREIGN PATENT DOCUMENTS

| | | |
|---|---|---|
| DE | 2902991 | 8/1980 |
| DE | 92024122 | 5/1992 |
| DE | 4205666 | 9/1993 |
| DE | 4303772 | 8/1994 |
| DE | 693 01 594 | 11/1996 |
| EP | 0 592 297 | 4/1994 |
| EP | 0592297 | 2/1996 |
| GB | 110683 | 11/1917 |
| GB | 722734 | 1/1955 |
| JP | 51-88272 | 8/1976 |
| JP | 55-17240 | 2/1980 |
| JP | 56-10824 | 5/1980 |
| JP | 56-120421 | 9/1981 |
| JP | 63-199928 | 1/1987 |
| JP | 5-196054 | 8/1993 |
| JP | 6-221339 | 8/1994 |
| SU | 510942 | * 9/1987 ............ 464/70 |

* cited by examiner

*Primary Examiner*—Greg Binda
(74) *Attorney, Agent, or Firm*—Davidson, Davidson & Kappel, LLC

(57) ABSTRACT

A coupling for connecting a driving machine part and a driven machine part, such as shafts, wheel hubs or the like, includes an intermediate shaft and articulated lever couplings situated at the ends of the intermediate shaft. Each articulated lever coupling has at least three identical articulated levers, which engage via elastic joints situated at their ends with the intermediate shaft and with the adjacent machine parts to be connected. The axes of the elastic joints of each articulated lever are oriented perpendicularly to an axial plane, the axial plane being parallel to the articulated lever and intersecting the axis of the intermediate shaft and the axes of the machine parts to be connected.

12 Claims, 4 Drawing Sheets

COUPLING

Priority is claimed to German Patent Application No. DE 102 32 286.4, filed on 16 Jul. 2003, the subject matter of which is hereby incorporated by reference herein.

BACKGROUND

The present invention relates to a coupling for connecting a driving machine part and a driven machine part, e.g., shafts, wheel hubs or the like, from an intermediate shaft and articulated lever couplings situated at the ends of the intermediate shaft, each having at least three identical articulated levers which engage via elastic joints situated at their ends with the intermediate shaft and with the adjacent machine part to be connected.

Couplings of this type are known for permitting an elastic interconnection of shafts for different purposes. These couplings have a high torsional rigidity. They function to compensate for radial and axial misalignment.

German Patent DE 42 05 666 C2, the subject matter of which is incorporated by reference herein, describes such a coupling in which the joints of the articulated lever engage with the intermediate shaft by way of secantially aligned wrist pins and engage by axially aligned wrist pins with a shaft to be connected. These couplings have proven successful. The elastomer bearings mounted on the shafts to be joined undergo mainly cardanic deformation in two axes when the coupling undergoes a deflection. It is therefore necessary to use spherical bearings as elastic elements for these bearings. This limits the radial lifetime of the spherical bearings, which cannot be increased arbitrarily. These bearings also require a considerable installation space.

SUMMARY OF THE INVENTION

An object of the present invention is to provide a coupling of this type having a long lifespan. A further or alternate object of the present invention is to provide a coupling of this type that is able to transmit substantially large radial loads using the same or reduced installation space. The present invention provides a coupling for connecting a driving machine part and a driven machine part, e.g., shafts, wheel hubs or the like, comprising an intermediate shaft and articulated lever couplings provided at the ends of the intermediate shaft. Each coupling has at least three identical articulated levers, engaging via elastic joints situated at their ends with the intermediate shaft and with the adjacent machine part which is to be connected. The axes (21) of the elastic joints (10) of each articulated lever (9) are perpendicular to an axial plane (22, 23) which is parallel to the articulated levers (9) and passes through the axis (8) of the intermediate shaft (4) and the axes (6, 7) of the machine parts (2, 3) that are to be connected.

With the novel coupling, the axes of the elastic joints of each articulated lever are aligned perpendicularly to an axial plane parallel to the articulated levers, which includes the axis of the intermediate shaft and the axes of the shafts to be connected. This configuration of the joints results in deformation of the elastomer bearing which is attributable primarily to torsion. This homogeneous deformation is tolerated better by the bearing. Only a very small portion of the deflection is cardanic. The bearing elements used may be optimized better to radial loads. Their spherical design may have larger radii; in the extreme case, cylindrical elements are used.

The articulated jointed levers are configured in a star pattern. The axes of the joints of each articulated lever are parallel. The preferred number of articulated levers used is four. In this case the axial plane may pass through the center of the two opposite articulated levers. Such a possibility also exists when using six articulated levers.

The axes of an articulated lever coupling are aligned so that they come to lie in a radial plane. Therefore, the intermediate shaft and the shafts to be joined are equipped with connecting flanges having radially and axially protruding claws. These claws support the bearing journals for the joints. The bearing journals may be integrally joined to the bearings or manufactured separately and mounted on the claws. In a number of applications it is advantageous if the bearing journals have a conical shape having a non-blocking conical seating. This facilitates dismantling.

The joints may be equipped with spherical bearings. However, it is advantageous if at least one joint is equipped with an articulated lever having a cylindrical bearing. The cylindrical bearing allows greater forces to be transmitted. The elastomer layer of the bearing is preferably bonded to the adjacent metal parts by vulcanization.

In an advantageous manner, the joints are provided with protruding lugs on their outer bearing shells, these lugs cooperating with a stop on the coupling to provide protection against loss in the event of damage to the elastomer.

For cost reasons, the connecting flange and the bearing journal may be manufactured separately. In this case the bearing journals are mounted on the intermediate shaft and/or the shafts to be joined by stud bolts.

When connecting shafts that may be subject to major misalignments, it is advantageous if the articulated levers are designed as lamellae in the axial direction of the intermediate shaft. These lamellae may absorb some of the misalignment.

BRIEF DESCRIPTION OF THE DRAWINGS

The present invention is discussed below with reference to the drawings, in which.

DETAILED DESCRIPTION

Figure 1:
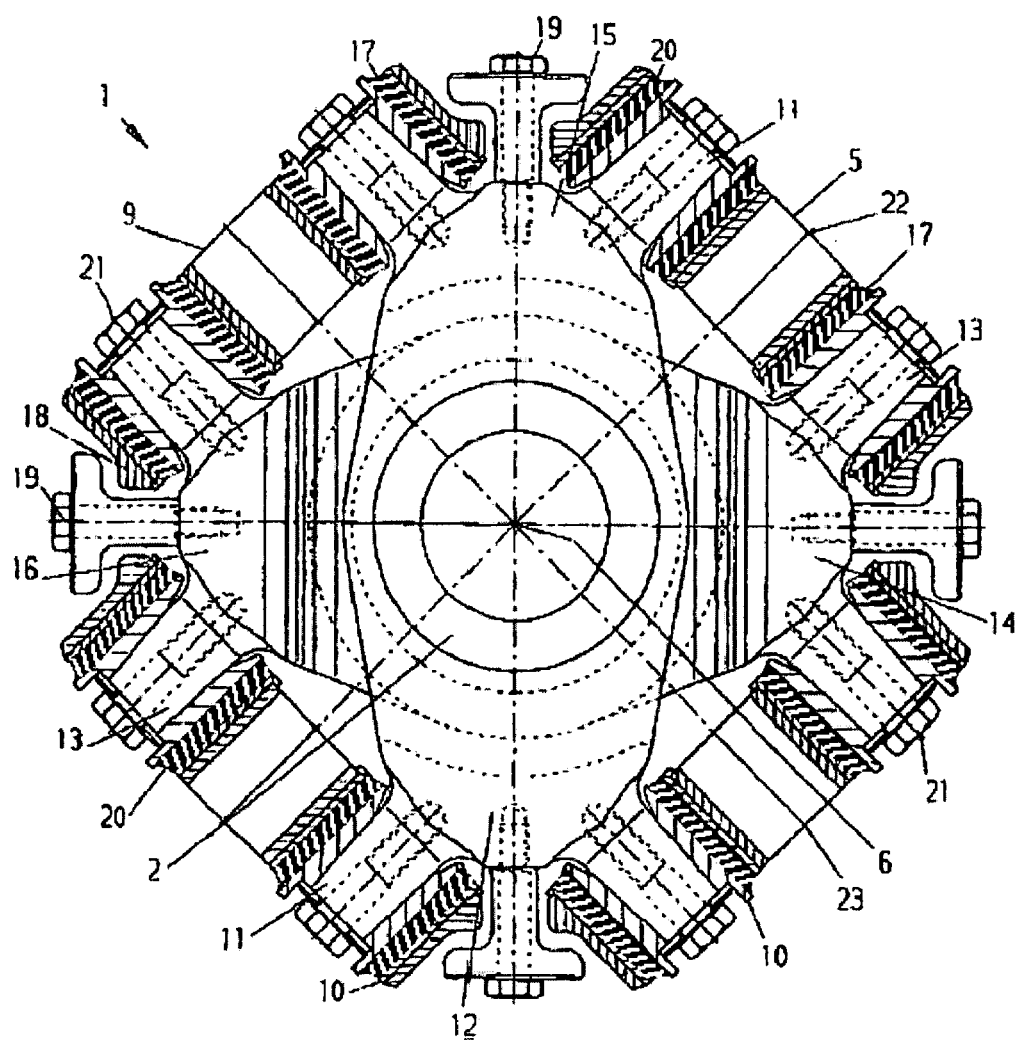
FIG. 1 shows a front view of the coupling.

Coupling 1 shown in a front view in FIG. 1 connects a shaft end 2 of a driving machine part with a shaft end 3 of a driven machine part. The shaft ends 2 and 3 each represents portions of a shaft or wheel hub of the driving machine part or driven machine part, only shaft end 2 being visible in the front view. Articulated lever couplings 5 are mounted in a star pattern around axes 6 and 7 of shaft ends 2 and 3 which are to be joined and axis 8 of intermediate shaft 4. Four articulated levers 9 of the same design are provided, engage with bearing journals 11 of connecting flange 12 of intermediate shaft 4 via joints 10 provided at their ends and with bearing journals 13 of connecting flange 14 of shaft end 2. Bearing journals 11 and 13 are integrally joined to claws 15 and 16 on connecting flanges 12 and 14. Bearing journals 11 and 13 are designed in a conical shape having a non-blocking conical seating. All joints 10 are equipped with cylindrical bearings 17. Articulated levers 9 have lugs 18 protruding on their outer ends via which they are held by bolts 19 on flanges 12, 14. This is also additional protection in the event one of elastomer layers 20 is damaged.

Axes 21 of elastic joints 10 of each articulated lever 9 are aligned perpendicularly to axial planes 22 and 23, which pass through axis 8 of intermediate shaft 4 and axes 6 and 7 of shaft ends 2 and 3. Axial planes 22 and 23 also run parallel to respective ones of articulated levers 9. Axes 21 of joints 10 of each articulated lever 9 are parallel.

Figure 2:
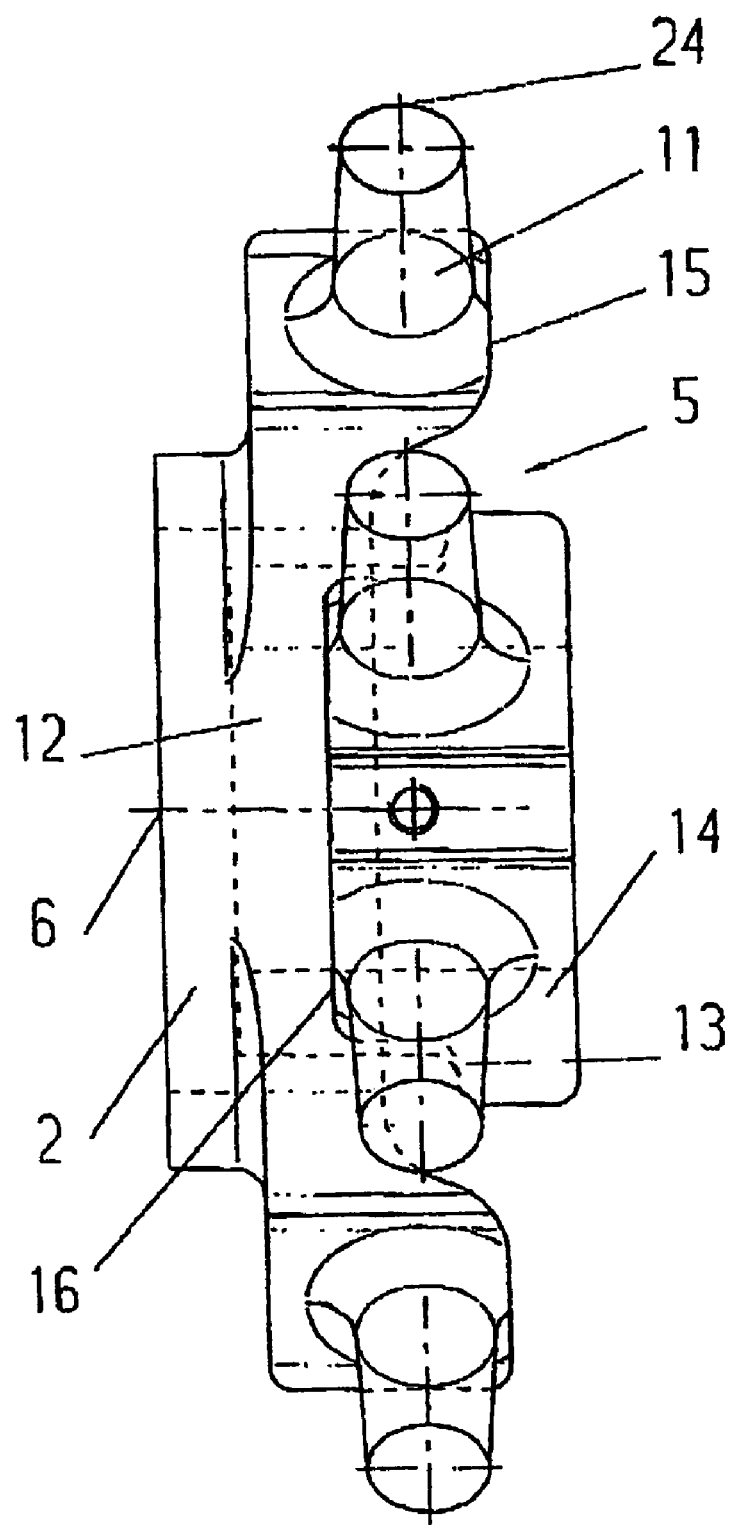
FIG. 2 shows an articulated lever coupling in a side view without the articulated lever or joints.

FIG. 2 shows an articulated lever coupling 5 in side view. The joints themselves together with the articulated levers have been omitted to clearly illustrate the allocation of bearing journals 11 and 13. Bearing journals 11 and 13 and thus axes 21 of joints 10 lie in a radial plane 24. Connecting flanges 12 and 14 have radially and axially protruding claws 15 and 16 which support bearing journals 11 and 13 for joints 10. The design of connecting flanges 12 and 14 together with protruding claws 15 and 16 permits the flanges to nearly penetrate one another, so that bearing journals 11 and 13 come to lie in the same radial plane 24.

Figure 3:
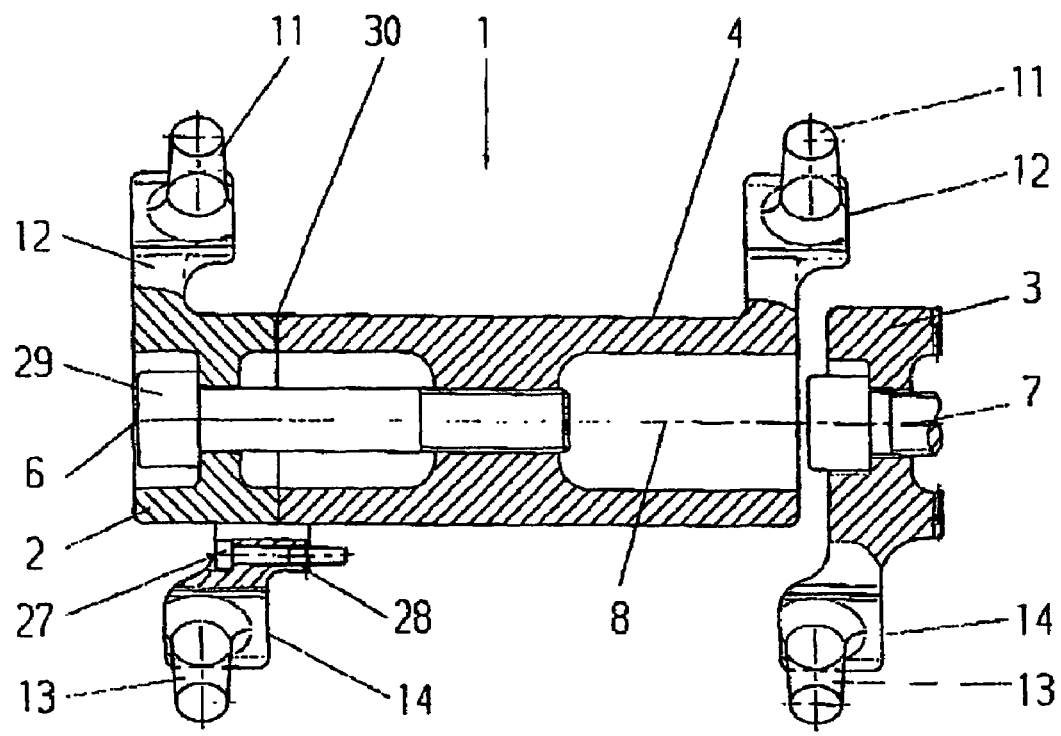
FIG. 3 shows the coupling in a longitudinal sectional view without the joints or articulated lever.

FIG. 3 shows coupling 1 without articulated lever 9 and joint 10 in a sectional view. Connecting flange 14 is bolted to a gear (not shown in detail here) by screws 27. To ensure a good transmission of force, end gearing 28, provided on the connecting flange, engages in a corresponding end gearing on the gear. Therefore, extremely high forces may be transmitted. Connecting flange 14 is joined to connecting flange 12 of intermediate shaft 4 via the articulated levers and joints (not shown in FIG. 3). For manufacturing and assembly reasons, intermediate shaft 4 is split. The two parts of intermediate shaft 4 are held together by bolt 29, an end gearing 30 also being provided at the connecting point. Second connecting flange 12 of intermediate shaft 4 is connected by the articulated lever and joints (not shown here) to connecting flange 14 of shaft end 3 which is connected to a wheel hub (not shown here). The torque coming from the gear is consequently transmitted via flange 14 and 12 or 12 and 14 and bearing journals 11 and 13 attached thereto as well as the articulated levers to be used together with joints to the wheel, e.g., of a streetcar.

Figure 4:
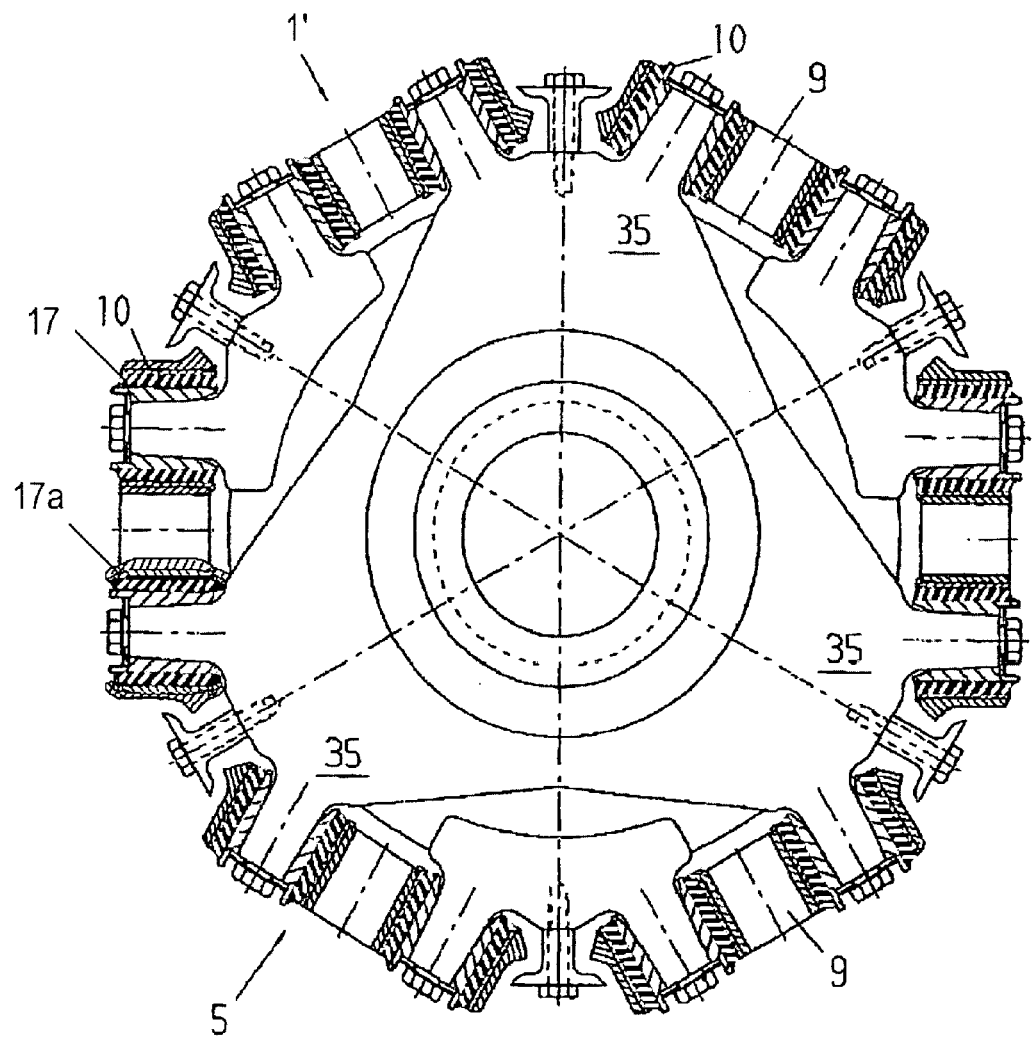
FIG. 4 shows a front view of a joint level coupling having six articulated levers.

FIG. 4 shows an embodiment of coupling 1' in which articulated lever coupling 5 has six articulated levers 9 having particular joints 10. The joints 10 may be equipped with cylindrical bearings or spherical bearings. For illustrative purposes, one of the joints in FIG. 4 is shown schematically having a spherical bearing 17a and the rest with cylindrical bearings 17. Typically, however, all of the bearings will either be cylindrical 17, or spherical 17a. In this case, each connecting flange is provided with three claws 35.

As discussed previously, and with reference to FIGS. 1–4, the present invention provides a coupling 1 for connecting a driving machine part and a driven machine part, e.g., shafts, wheel hubs or the like, comprising an intermediate shaft 4 and articulated lever couplings 5 provided at the ends of the intermediate shaft. Each coupling has at least three identical articulated levers 9, engaging via elastic joints 10 situated at their ends with the intermediate shaft 4 and with the adjacent machine part which is to be connected. The axes (21) of the elastic joints (10) of each articulated lever (9) are perpendicular to an axial plane (22, 23) which is parallel to the articulated levers (9) and passes through the axis (8) of the intermediate shaft (4) and the axes (6, 7) of the machine parts (2, 3) that are to be connected.

With the novel coupling, the axes of the elastic joints 10 of each articulated lever 9 are aligned perpendicularly to an axial plane 23 parallel to the articulated levers 9, which includes the axis 8 of the intermediate shaft 4 and the axes 6, 7 of the shafts to be connected 2, 3. This configuration of the joints 10 results in deformation of the elastomer bearing which is attributable primarily to torsion. This homogeneous deformation is tolerated better by the bearing. Only a very small portion of the deflection is cardanic. The bearing elements used may be optimized better to radial loads. Their spherical design may have larger radii; in the extreme case, cylindrical elements are used.

The articulated jointed levers are configured in a star pattern. The axes 21 of the joints 10 of each articulated lever 9 are parallel. The preferred number of articulated levers used is four, as shown in FIG. 1. In this case the axial plane 23 may pass through the center of the two opposite articulated levers 9. Such a possibility also exists when using six articulated levers, as shown in FIG. 4.

The axes of an articulated lever coupling 5 are aligned so that they come to lie in a radial plane. Therefore, the intermediate shaft 4 and the shafts to be joined 2, 3 are equipped with connecting flanges 12, 14 having radially and axially protruding claws 15, 16, 35. These claws support the bearing journals 11 for the joints 10. The bearing journals 11 may be integrally joined to the bearings 17, 17a or manufactured separately and mounted on the claws 15, 16, 35. In a number of applications it is advantageous if the bearing journals 13 have a conical shape having a non-blocking conical seating. This facilitates dismantling.

The joints may be equipped with spherical bearings 17a. However, it is advantageous if at least one joint is equipped with an articulated lever 9 having a cylindrical bearing 17. The cylindrical bearing allows greater forces to be transmitted. The elastomer layer 20 of the bearing 17 is preferably bonded to the adjacent metal parts by vulcanization.

What is claimed is:

1. A coupling for connecting a driving machine part and a driven machine part, comprising:
   an intermediate shaft defining a shaft axis and having two shaft ends and at least one first connecting flange that includes a radially and axially protruding first claw having a plurality of first bearing journals and wherein each of the driving machine part and the driven machine part include at least one second connecting flange that includes a radially and axially protruding second claw having a plurality of second bearing journals; and
   a first articulated lever coupling disposed at one of the two shaft ends and having at least three identical articulated levers, each lever having two lever ends and an elastic joint defining a joint axis disposed at each lever end, each elastic joint including a bearing having an elastomer layer surrounding the respective joint axis, each lever engaging with the intermediate shaft at one of the plurality of first bearing journals and one of the driving machine part and the driven machine part at one of the second bearing journals via the elastic joints, wherein the joint axes of each lever are disposed perpendicular to a respective axial plane intersecting the shaft axis, wherein each of the plurality of first and second bearing journals includes a conical shape for a non-blocking seating with the elastic joints.

2. The coupling as recited in claim 1, further comprising a second articulated lever coupling disposed at the other of the two shaft ends and having at least three identical articulated second levers, each second lever having two second lever ends and an elastic second joint defining a second joint axis disposed at each second lever end, each second lever engaging with the intermediate shaft and one of the driving machine part and the driven machine part via the elastic second joints, the second joint axes of each second lever are disposed perpendicular to the shaft axis.

3. The coupling as recited in claim 1, wherein the driving machine part includes at least one of a shaft and a wheel hub.

4. The coupling as recited in claim 1, wherein the driven machine part includes at least one of a shaft and a wheel hub.

5. The coupling as recited in claim 1, wherein the joint axes of each articulated lever are parallel to one another.

6. The coupling as recited in claim 1, wherein the at least three articulated levers include four or six articulated levers, and each of the respective axial planes pass through a center of two of the articulated levers.

7. The coupling as recited in claim 1, wherein the joint axes lie in a radial plane.

8. The coupling as recited in claim 1, wherein each of the claws is integrally connected to at least one of the first and second bearing journals.

9. The coupling as recited in claim 1, wherein the bearing of each joint is spherical.

10. The coupling as recited in claim 1, wherein the bearing of at least one of the joints is cylindrical.

11. The coupling as recited in claim 1, wherein the elastomer layer is bonded to an adjacent metal part of the joint by vulcanization.

12. The coupling as recited in claim 1, wherein each of the articulated levers includes a protruding lug.

\* \* \* \* \*

UNITED STATES PATENT AND TRADEMARK OFFICE
CERTIFICATE OF CORRECTION

| | | |
|---|---|---|
| PATENT NO. | : 7,104,892 B2 | Page 1 of 1 |
| APPLICATION NO. | : 10/620482 | |
| DATED | : September 12, 2006 | |
| INVENTOR(S) | : Detlef Cordts, Robert Peters and Christian Meyer | |

It is certified that error appears in the above-identified patent and that said Letters Patent is hereby corrected as shown below:

On the title page, insert the following reference in paragraph
(56) References cited
under the heading
U.S. PATENT DOCUMENTS:

-- 4,804,352   2/1989   Schmidt   464/17 --

Column 1, line 3, cancel the text beginning with "Priority is claimed" to and ending "by reference herein." in column 1, line 5, and insert the following priority data:

-- Priority is claimed to German Patent Application No. DE 102 32 286.4, filed on 16 Jul. 2002, the subject matter of which is hereby incorporated by reference herein. --

Signed and Sealed this

Sixteenth Day of January, 2007

JON W. DUDAS
*Director of the United States Patent and Trademark Office*